(12) United States Patent
Gerhardinger

(10) Patent No.: US 6,171,646 B1
(45) Date of Patent: Jan. 9, 2001

(54) METHOD FOR MAKING AN ABRASION AND SCRATCH RESISTANT COATED GLASS ARTICLE

(75) Inventor: Peter F. Gerhardinger, Hendersonville, TN (US)

(73) Assignee: Engineered Glass Products, LLC, Chicago, IL (US)

( * ) Notice: Under 35 U.S.C. 154(b), the term of this patent shall be extended for 0 days.

(21) Appl. No.: 09/457,562

(22) Filed: Dec. 9, 1999

(51) Int. Cl.⁷ .................................................. B05D 3/12
(52) U.S. Cl. ........................ 427/166; 427/165; 427/331; 427/389.7; 427/407.2; 427/419.2
(58) Field of Search ................................. 427/165, 166, 427/331, 389.7, 407.2, 419.2

(56) References Cited

U.S. PATENT DOCUMENTS

| | | |
|---|---|---|
| 3,959,565 | 5/1976 | Jordan et al. . |
| 4,187,336 * | 2/1980 | Gordon .................................. 428/34 |
| 4,847,157 | 7/1989 | Goodman et al. . |
| 4,910,088 * | 3/1990 | Baudin et al. ........................ 428/432 |
| 5,232,783 | 8/1993 | Pawar et al. . |
| 5,635,245 | 6/1997 | Kimock et al. . |
| 5,637,353 | 6/1997 | Kimock et al. . |
| 5,800,918 * | 9/1998 | Chartier et al. ....................... 428/336 |

* cited by examiner

*Primary Examiner*—Katherine A. Bareford
(74) *Attorney, Agent, or Firm*—Marshall & Melhorn

(57) ABSTRACT

A glass substrate is provided with a tin oxide coating. The tin oxide coating is then polished, preferably with alumina. The polishing removes the peaks from the tin oxide coating and produces a less abrasive coating. A coating of polymeric material may be applied after the polishing operation. The polymeric coating improves the lubricity of the surface of the glass substrate. The glass substrate is then heated so that the polymeric material adheres to the substrate. The invention provides greatly improved resistance to abrasion and scratching for a coated glass article. The invention may advantageously be used in automotive, architectual and bar code scanner applications.

14 Claims, 1 Drawing Sheet

METHOD FOR MAKING AN ABRASION AND SCRATCH RESISTANT COATED GLASS ARTICLE

BACKGROUND OF THE INVENTION

The use of glass in the automotive, architectual and bar code scanner manufacturing industries is well known. Characteristics of glass which make it a popular material in these industries are its transparency, low cost, high strength and ability to act as a substrate. However, glass is not a particularly hard material and it frequently abrades and scratches in the above mentioned applications.

Abrasions and scratches are distinguishable. An abrasion is defined as "a wearing, grinding, or rubbing away by friction." Webster's Ninth New Collegiate Dictionary 46 ($9^{th}$ ed. 1988). A scratch is defined as a "scrape or dig." Id. at 1054. Furthermore, measuring materials' susceptibility to scratching is measured in a different manner than their susceptibility to abrasion. Scratch susceptibility is tested by a person skilled in the art drawing a fresh nail across the material. Abrasion susceptibility is tested by a Taber abrader, pencil erasers or ordinary abrasive cleaners applied to the material.

In the past, coatings have been used to enhance the abrasion and scratch resistance of glass. U.S. Pat. No. 5,637,353 reveals one method of producing an abrasion and wear resistant coated substrate by Chemical Vapor Deposition (CVD). The '353 patent teaches the use of a substrate, one or more intermediate layers and a top, low friction layer such as a diamond-like carbon (DLC) material. One or more optically transparent intermediate layers capable of forming a strong chemical bond to the substrate and the DLC layer is deposited onto the substrate. Each intermediate layer has a thickness of about 1 to 20 microns and has a hardness greater than that of the substrate. After the desired number of layers are deposited, a low friction DLC layer is deposited onto the coated substrate. Tin oxide is one of dozens of substances disclosed as a suitable composite layer. The final step is cooling the coated substrate to room temperature by means of passing inert gas over the substrate.

DLC films are known in the art for their abrasion and corrosion resistance and their excellent optical properties. However, the abrasion resistance of a DLC film is a function of its ability to adhere to the parent substrate. The improved abrasion resistance of DLC coatings is only available if the adherence to the substrate is excellent and this is difficult to achieve.

U.S. Pat. No. 5,635,245 teaches the same process as U.S. Pat. No. 5,637,353, but specifies several alternative intermediate layers. One intermediate layer consists of silicon oxide or aluminum oxide under a layer of material devoid of alkali atoms and fluorine. An intermediate layer consisting solely of silicon oxynitride is also taught. Alternatively, an intermediate layer consisting of silicon oxynitride combined with a layer of silicon oxide is disclosed. The final intermediate layer taught is a silicon oxynitride layer with a layer of aluminum oxide. Both this patent and the '353 patent teach away from the use of a polymeric material for the composite layer.

U.S. Pat. No. 5,232,783, issued to Pawar et al., discloses abrasion and scratch resistant coatings for glass articles. A coating composition is provided which includes an organooxy-chainstopped organopolysilsesquioxane, a tetraorganotitianate, a siloxane-functionalized ester having the general formula $(R^3O)_{3-2n}SiO_nR^4OC(O)R^5C(O)OR^6$, wherein n is equal to 0, ½, or 1, $R^3$ is independently a saturated or unsaturated monovalent hydrocarbon radical containing from 1 to about 20 carbon atoms, $R^4$ is a divalent hydrocarbon radical containing from 1 to about 20 carbon atoms, $R^5$ is a divalent conjugated olefinic radical having from 2 to 4 carbon atoms, and $R^6$ is $R^3$ or $R^4SiO_n(OR^3)_{3-2n}$; or a cyanoorganotri-organooxysilane and an organic carboxylic acid ester; and from 0% to about 85% of a volatile diluent. Also provided is an abrasion and scratch resistant coating composition for a copolymer of the organopolysilsequixane above and the siloxane-functionalized ester previously mentioned.

Despite the wide variety of methods known to produce abrasion and scratch resistant coated glass, it would be advantageous to have a coating with a lower probability of collecting and retaining deposits from metals passed over its surface to endure either high wear environments, such as the top surface of a bar code scanner, or environments susceptible to scratching by vandals.

SUMMARY OF THE INVENTION

The invention is an abrasion and scratch resistant coated glass substrate which may be used in vehicles, commercial architectual products or high wear environments such as the top surface of a bar code scanner. This invention comprises a tin oxide coating on at least one surface of a glass substrate. The glass substrate, optionally, may be tempered and/or may contain a color suppression layer.

Tin oxide is a hard material which resists abrasion and scratching. On the Mho hardness scale, where diamonds have a hardness value of 10 and talc has a hardness of 1, tin oxide has a hardness of 7. However, as deposited by the CVD process the crystallites and grain size of the tin oxide produce a relatively rough coating surface. Therefore, in accordance with the invention, the peaks in the tin oxide coating are removed or reduced to lower the surface resistance of the coating.

To efficiently and quickly remove the peaks in the tin oxide layer, it is advantageous to use a very hard polishing material. Preferably, the polishing material is commonly available so that the polishing can be conveniently and economically accomplished. Alumina is one material that is hard enough to polish the tin oxide coating and is commonly available. Therefore, alumina is preferably used to remove the peaks in the tin oxide coating and provide a less abrasive surface.

Polishing the tin oxide layer to remove the peaks produces a hard but less abrasive surface, however, it would also be advantageous to then apply an overcoating to fill in the remaining depressions in the tin oxide coating and to increase the lubricity of the surface. A polymeric material, such as polyethylene, could be used to overcoat the tin oxide layer and provide the desired lubricity.

The resulting coated glass article has an increased resistance to abrasion and scratching. Additionally, the surface of the present invention has a lower probability of collecting and retaining deposits from metals passed over its surface. These characteristics allow the present invention to withstand high wear environments for a prolonged period of time.

BRIEF DESCRIPTION OF THE DRAWINGS

The above, as well as other advantages of the present invention, will become readily apparent to those skilled in the art from the following detailed description of a preferred embodiment when considered in the light of the accompanying drawings, in which.

DETAILED DESCRIPTION OF THE PREFERRED EMBODIMENTS

It is to be understood that the specific structures and processes illustrated in the attached drawings, and described in the following description are simply exemplary embodiments of the inventive concepts defined in the appended claims. Hence, specific dimensions and other physical characteristics relating to the embodiments disclosed herein should not be considered as limiting, unless the claims expressly state otherwise.

Figure 1:
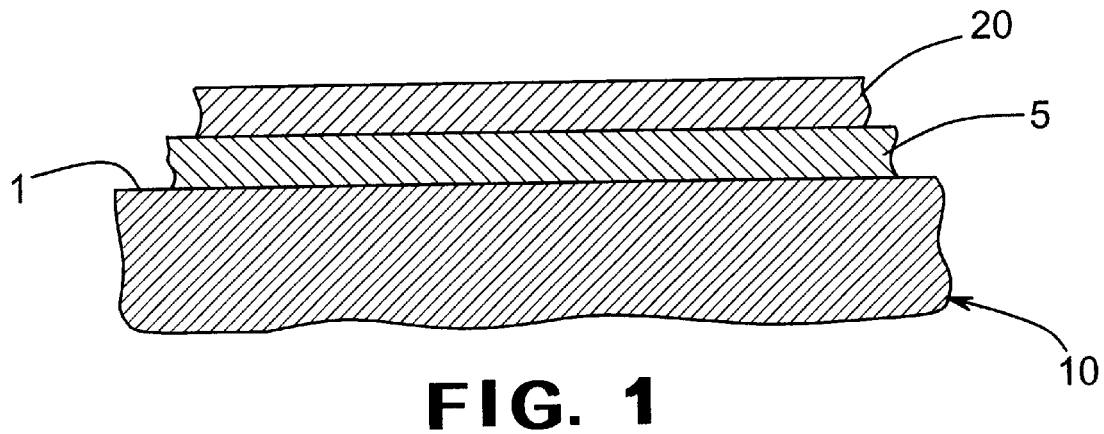
FIG. 1 is a broken, cross-sectional view of a coated glass article of the invention.

Referring now to the drawings, FIG. 1 depicts a tin oxide coating 20 disposed on the surface 1 of a glass substrate on which a color suppression layer 5 has been deposited. In the preferred embodiment, the tin oxide layer 20 is pyrolytically applied to at least one side of the glass substrate 10. The glass substrate 10 will typically range in thickness from 2.3 to 6 millimeters.

The glass substrate 10, optionally, may be tempered. When a glass article is tempered it is quickly cooled from near the softening point under careful control. Tempering acts to increase the hardness and strength of a glass article. Both hardness and strength are highly desirable characteristics for this invention, as they will allow the article to withstand high wear environments for a prolonged period of time. However, to practice this invention, neither tempering or any other heat strengthening technique is required.

A color suppression layer 5 will also be present in the preferred embodiment of this invention. The color suppression layer 5 of the present invention provides a means to reflect and refract light to interfere with the observance of iridescence. Color suppression layers are conventionally known within the art. For example, U.S. Pat. Nos. 4,187,336, 4,206,252 and 4,419,386, issued to Gordon, herein incorporated by reference, describe coating techniques suitable for suppressing interference colors. The interlayer of the present invention may comprise a single iridescence-suppressing coating, a two component coating, or a gradient coating.

The glass substrate 10 and any optional color suppression layer 5 are covered with a layer of tin oxide 20. The coating 20, preferably ranging in thickness from approximately 2500 Å to 3500 Å, is applied to the surface of the glass substrate 10. It is acceptable to use coatings as thin as 500 Å, and as thick as 5000 Å in this invention. However, coatings thinner than 500 Å may produce an uneven distribution, and may not be thick enough to be polished and still provide the desired effect. Alternatively, coatings thicker than 5000 Å may result in excessive roughness, light scattering and absorption which would limit the invention's use in certain applications, such as part of a bar code scanner.

Tin oxide has the advantage of being a very hard, abrasion and scratch resistant material. This characteristic of tin oxide makes it an ideal material for applications in environments susceptible to abrasion and scratching. However, the crystallites and grain sizes of the tin oxide produce a coating with a very rough surface. As a result of this roughness, the conventional tin oxide coating will "grab" metallic items passed over it and retain some of the material on the tin oxide surface. Materials retained on the surface of the article result in the undesirable characteristic of increased roughness and light scattering. Therefore, in accordance with the invention, the tin oxide layer 20 is polished to remove or reduce any peaks in its surface.

However, the properties which make tin oxide a hard coating also make it difficult to polish. To polish it quickly and efficiently, a polishing material should be used that not only is hard but is also readily available. In the preferred embodiment, the tin oxide coating 20 is polished with alumina to remove or reduce any peaks in its surface. The hardness of alumina and its common availability make it the preferred substance to polish the tin oxide coating 20.

Ideally, the tin oxide coating 20 is polished with an automated horizontal-axis metal buffer machine, where parameters such as the pressure applied, the polishing speed and the number of cycles, etc. can be precisely controlled. Use of a metal buffer machine is the preferred method to complete the tin oxide polishing step, however, the present invention is not limited to this polishing method alone. Alternatively, the tin oxide coating 20 may be polished by hand. Manual polishing typically involves using felt covered blocks to polish the tin oxide with, for example, a 5 micron alumina slurry. The blocks assist in distributing the slurry with even pressure across the surface.

Methods by which one may determine when the tin oxide layer 20 has been sufficiently polished include, but are not limited to, a "scratch" test and a "writing" test. The first method involves one skilled in the art passing a fresh six penny nail over the tin oxide coating 20 to determine if the surface "grabs" the nail. If the surface grabs the nail, it is an indication that the surface has not yet been sufficiently polished.

One skilled in the art may also use a standard lead pencil to write on the surface of the polished tin oxide coating. If any lead is deposited on the surface, the surface roughness has "grabbed" the graphite from the pencil and deposited it onto the surface, indicating that more, or better, polishing is needed. Although two methods to determine when the tin oxide has been sufficiently smoothed are described here, the present invention is not limited to either of these methods.

A minimum of 100 Å of the tin oxide coating must be removed to achieve sufficient leveling of the peaks. Removing less than 100 Å results in insufficient leveling of the tin oxide peaks. In the preferred embodiment of the invention, removing approximately 150 Å to 300 Å of the tin oxide coating will be suitable. Removing this amount of tin oxide will eliminate the majority of peaks formed in the coating. However, in the most preferred embodiment of the invention, approximately 200 Å of the tin oxide coating will be removed. Removing more than 300 Å significantly changes the electrical and structural properties of the article, which may be important depending on the application.

Figure 2:
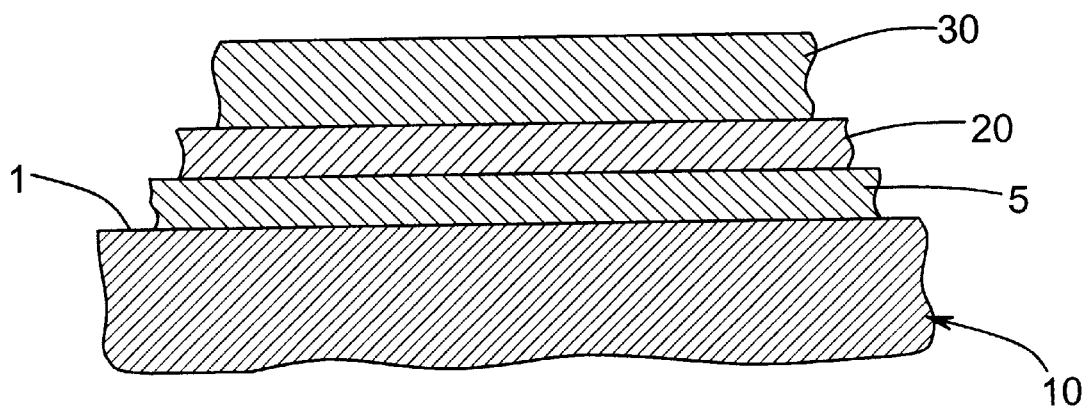
FIG. 2 is a broken, cross-sectional view of a coated glass article of the invention with a polymeric material overcoating.

Although the tin oxide has been polished to remove the peaks in its surface, in a preferred embodiment an overcoating is added to fill in the remaining valleys of the tin oxide coating and to increase the lubricity of the surface. FIG. 2 shows a polymeric material 30 which has been applied, for example by spraying, onto the polished tin oxide layer 20 to improve the lubricity of the coating's surface. Suitable types of polymeric coatings include polymers of stearic acid, oleic acid or fatty acid or polyethylene. The polymeric overcoating 30 will have a thickness of at least several microns.

Ideally, polyethylene will be used to overcoat the tin oxide layer 20, as it is one of the most durable of the readily available coatings. In the preferred embodiment, the polyethylene will be sprayed on at a slightly elevated temperature of approximately 250 degrees F. The glass article is then heated to a sufficient temperature for a time sufficient to adhere the polymeric material 30 to the tin oxide layer 20. A sufficient quantity of polyethylene will be applied so that one skilled in the art cannot, using normal hand pressure, scratch the surface with a six penny nail.

In accordance with the provisions of the patent statutes, the present invention has been described in what is considered to represent its preferred embodiment, however, it should be noted that the invention can be practiced otherwise than as specifically illustrated and described without departing from its spirit or scope.

What is claimed is:

1. A method of making an abrasion and scratch resistant coated glass article, comprising:
    providing a glass substrate having a surface;
    applying a tin oxide coating of a pre-determined thickness to said surface of said glass substrate;
    reducing the thickness of said tin oxide coating by no more than approximately 300 Å to remove peaks therein; and
    applying a polymeric material of a pre-determined thickness to said tin oxide coating.

2. A method as defined in claim 1, further comprising tempering the glass substrate before applying said tin oxide coating.

3. A method as defined in claim 1, further comprising applying a color suppression layer on said surface of the glass substrate prior to applying said tin oxide coating.

4. A method as defined in claim 1, wherein said tin oxide is pyrolytically applied.

5. A method as defined in claim 1, further comprising reducing the surface of said tin oxide coating with alumina to remove peaks therein.

6. A method as defined in claim 5, further comprising reducing the surface of said tin oxide coating with alumina by mechanical means.

7. A method as defined in claim 5, further comprising reducing the surface of said tin oxide coating with alumina by manual means.

8. A method as defined in claim 1, wherein said tin oxide coating is reduced until a fresh six penny nail applied to said coating does not scratch said coating.

9. A method as defined in claim 1, wherein said tin oxide is reduced until a lead pencil applied to said coating fails to visibly deposit lead on said coating.

10. A method as defined in claim 1, further comprising heating said polymeric coating to a sufficient temperature for a sufficient time to secure said coating to said glass substrate.

11. A method as defined in claim 1, wherein reducing said tin oxide coating results in the removal of at least 100 Å from the surface of said tin oxide coating.

12. A method as defined in claim 1, wherein said polymeric coating includes an organic polymer.

13. A method as defined in claim 12, wherein said organic polymer is a polymer of stearic acid, oleic acid, or a fatty acid, or polyethylene.

14. A method of making an abrasion and scratch resistant coated glass article, comprising:
    providing a glass substrate having a surface;
    applying a tin oxide coating to said surface of said glass substrate, said tin oxide having an exposed, outer surface; and
    reducing the thickness of said tin oxide coating by at least 100 Å, but not more than approximately 300 Å, by removing said tin oxide from the outer surface of said tin oxide coating.

* * * * *